United States Patent [19]

Uchimura et al.

[11] Patent Number: 4,931,242

[45] Date of Patent: Jun. 5, 1990

[54] METHOD OF FORMING SHAPED-BODY TO BE SINTERED

[75] Inventors: Shoji Uchimura, Nagoya; Hironobu Amano, Toyohashi; Kazuhiro Ohta, Toyokawa; Hirohide Ishiguro, Gamogori; Takehiko Matsumoto, Shinshiro; Takuya Ito, Toyokawa, all of Japan

[73] Assignee: Sintokogio, Ltd., Nagoya, Japan

[21] Appl. No.: 277,120

[22] Filed: Nov. 29, 1988

[30] Foreign Application Priority Data

Feb. 19, 1988 [JP] Japan .................................. 63-37114

[51] Int. Cl.[5] .......................... B28B 1/26; B28B 7/36; B29C 33/40

[52] U.S. Cl. ...................................... 264/87; 264/220; 264/316; 264/338; 264/343; 264/511

[58] Field of Search ................... 264/86, 87, 313, 510, 264/511, 553, 554, 316, 317, 82, 83, 101, 341, 343, 219–221, 225, 338; 164/7.1, 7.2, 160.1, 160.2

[56] References Cited

U.S. PATENT DOCUMENTS

| | | | |
|---|---|---|---|
| 1,657,870 | 1/1928 | Sherts | 264/343 X |
| 1,889,061 | 11/1932 | Dickie et al. | 264/343 |
| 3,269,886 | 8/1966 | Dellenbaugh | 264/343 |
| 3,352,960 | 11/1967 | McLaughlin | 264/343 |
| 3,663,678 | 5/1972 | Miller | 264/343 X |
| 3,843,301 | 10/1974 | Hijikata et al. | 264/510 X |
| 3,955,266 | 5/1976 | Honami et al. | 264/554 X |
| 4,028,455 | 6/1977 | Ueda et al. | 264/510 X |
| 4,157,109 | 6/1979 | Toyoda et al. | 264/510 X |
| 4,291,739 | 9/1981 | Baur | 164/7.1 X |
| 4,331,628 | 5/1982 | Ziegler | 264/553 |
| 4,764,320 | 8/1988 | Chau et al. | 264/343 X |

FOREIGN PATENT DOCUMENTS

| | | | |
|---|---|---|---|
| 2511620 | 9/1975 | Fed. Rep. of Germany | 164/7.2 |
| 18217 | 6/1976 | Japan | 164/7.2 |
| 35524 | 10/1976 | Japan | 164/7.1 |
| 16137 | 5/1977 | Japan | 264/554 |
| 36015 | 9/1980 | Japan | 164/7.2 |
| 36016 | 9/1980 | Japan | 164/7.2 |
| 27750 | 2/1984 | Japan | 164/72 |

*Primary Examiner*—Jan H. Silbaugh
*Assistant Examiner*—Karen D. Kutach
*Attorney, Agent, or Firm*—Armstrong, Nikaido, Marmelstein, Kubovcik & Murray

[57] ABSTRACT

A method of forming from a sintering material slurry a shaped-body to be sintered having a complicated configuration. A mold is prepared using frames, a shielding member swollen with a solvent, and a filler including a substance formed of particles, and utilizing the action of vacuum. A sintering material slurry is poured into the thus prepared mold to form a shaped-body to be sintered.

7 Claims, 2 Drawing Sheets

METHOD OF FORMING SHAPED-BODY TO BE SINTERED

BACKGROUND OF THE INVENTION

The present invention relates to a method of forming a shaped-body to be sintered, which is suitable for forming from a slurry serving as a sintering material a shaped-body to be sintered, such as a body with a complicated configuration or the like.

Hitherto, various methods have been used to form from ceramic powders shaped-bodies which are to be sintered. A slip casting method is one of them and is widely used as a method of forming shaped-bodies with complicated configurations.

It is known to use a gypsum mold in a slip casting method. However, the use of the gypsum mold has encountered such problems as a difficulty found in releasing a shaped-body with a complicated configuration from the mold used, and a poor durability of such molds. To cope with these problems, the present inventors have previously proposed a method (Japanese Patent Unexamined Publication No. 62-268603) wherein a shielding member, which is impermeable to air and is dissolvable in a solvent for the slurry to be used or a porous shielding member which is permeable to the slurry solvent, is tightly adhered to the forming surface of a pattern member, a frame is disposed on the side of the shielding member that is remote from the pattern member, a substance formed of particles is charged into the frame, the upper surface of the particle-formed substance is sealed and then a negative pressure within the frame is produced to thereby allow the shielding member to be sucked onto the particle-formed substance, the pattern member is separated from the shielding member to thereby prepare one half of a mold having a molding surface, the thus prepared mold part is joined to another half of the mold which has been prepared by the same processes as those described above to thereby define a cavity, a slurry comprising a sintering material and a solvent added thereto is poured into the cavity, and the negative pressure within the frame is released to cause the molding surface to collapse.

The previously proposed method, however, has encountered the following problems In the process of tightly adhering a shielding member which is impermeable to air and dissolvable in a slurry solvent or a porous shielding member which is permeable to the slurry solvent, to the forming surface of the pattern member, the shielding member is subjected to a softening treatment in which it is heated by a burner or the like to enhance the flexibility of the shielding member. If, for instance, a polyvinyl alcohol film is used, the heating of the film causes dehydration reactions and changes in properties, resulting in the production of polyvinyl ether, thereby making part of the film insoluble in the solvent. In such cases, therefore, when the slurry has been poured, the absorption and removal of the slurry solvent by the shielding member may become uneven, causing uneven wall thickness to be obtained and low permeation of the slurry solvent, which in turn may result in the generation of local defects (holes) and, hence, the production of a defective sintered body.

Further, the changes in the properties of part of the shielding member cause concentrated stress, leading to partial breakage of the shielding member and, hence, leakage of the slurry. In cases where other types of resins are used, the heating treatment causes chemical reactions and changes in properties, resulting in similar problems.

SUMMARY OF THE INVENTION

The present invention has been accomplished in view of the above-discussed problems, and it is an object of the present invention to enable the formation of a good shaped-body to be sintered, by evenly imparting flexibility and extensibility to the shielding member without using any heating treatment, thereby allowing the shielding member to be sucked onto the pattern member.

To this end, according to the present invention, in the method of forming a shaped-body to be sintered which is disclosed in Japanese Patent Unexamined Publication No. 62-268603, a member formed of a material permeable to a slurry solvent is used as a sheet-like shielding member, and, before the shielding member is to be tightly adhered to a pattern member, the shielding member is evenly moistened to allow the member to swell, thereby imparting flexibility and extensibility to the shielding member.

According to the method of the invention, since the shielding member to be sucked onto a shape pattern plate is evenly moistened with a slurry solvent, the shielding member can be evenly provided with flexibility and extensibility. This feature enables even absorption and removal of the slurry solvent (water) and even wall thickness, which in turn provide various significant effects such as the effect in that a shaped-body to be sintered can be stably formed with even density.

The above and other objects, features, and effects of the invention will become more apparent from the following description.

DESCRIPTION OF THE PREFERRED EMBODIMENTS

The present invention will be described hereunder with respect to certain examples and embodiments.

(Examples)

Experiments were conducted concerning swelling properties, using different types of solvents and shielding members. In the experiments, a sample of a shielding member was dipped in a solvent contained in a beaker, and the solubility was examined. The results are shown in the following table.

TABLE 1

| | SHIELDING MEMBER | | | | |
|---|---|---|---|---|---|
| SOLVENT | CELLOPHANE | POLYSTYRENE | POLYPROPYLENE | WATER SOLUBLE POLYVINYL ALCOHOL | DIACETATE |
| WATER | SWELLING | INSOLUBLE | INSOLUBLE | SWELLING | INSOLUBLE |
| ACETONE | MOISTUREPROOF FILM: SOLUBLE | INSOLUBLE | INSOLUBLE | INSOLUBLE | SOLUBLE |
| ETHYL ACETATE | MOISTUREPROOF FILM: SOLUBLE | SOLUBLE | INSOLUBLE | INSOLUBLE | SOLUBLE |
| TOLUENE | MOISTUREPROOF FILM: SOLUBLE | SOLUBLE | SWELLING | INSOLUBLE | INSOLUBLE |
| METHYLENE CHLORIDE | MOISTUREPROOF FILM: SOLUBLE | SOLUBLE | INSOLUBLE | INSOLUBLE | SOLUBLE |

As will be seen from the table, a suitable combination of a solvent and a shielding member enables swelling. In the experiments, a combination which resulted in the shielding member sample being dissolved was considered as being capable of achieving swelling.

Figure 1:
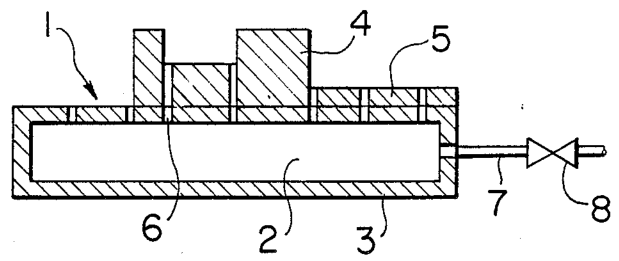
FIG. 1 is a sectional view of a shape pattern plate.

Certain embodiments of the present invention will now be described in detail with reference to the drawings. FIG. 1 shows a shape pattern plate 1. The shape pattern plate 1 comprises a base 3 having a hollow chamber 2 formed therein, a shape pattern 4, and a ridge 5 for forming a slurry flow passage, the pattern 4 and the ridge 5 being provided on the base 3. A plurality of vent holes 6 communicating with the hollow chamber 2 are formed in the base 3 and the shape pattern 4. The hollow chamber 2 is connected to and communicates with a suction device (not shown) through a hose 7 and a changeover valve 8.

Figure 2:
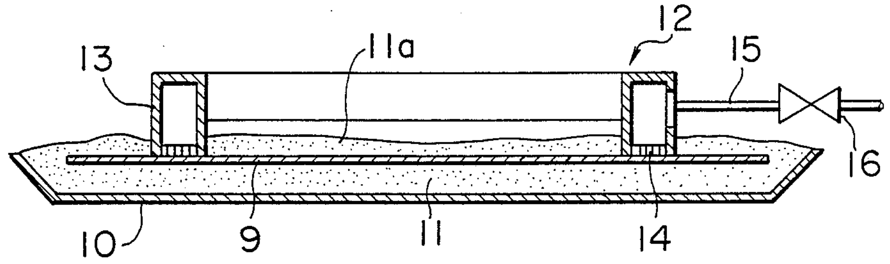
FIG. 2 is a sectional view showing a state in which a shielding member is being moistened.

Referring to FIG. 2, there is shown a state in which a sheet-like shielding material 9 is moistened so as to swell. Specifically, a dish-shaped vessel 10 receives a porous moistening material 11 which is formed by evenly mixing a porous material (e.g., AL13PC (trade name), a product of Showa Denko K.K., which has a particle size of 80 $\mu$), with 3 to 5 wt % of water added thereto The porous moistening material 11 is evenly spread inside the vessel 10 in such a manner as to form a layer of about 2 cm. Subsequently, a shielding member 9 comprising a water soluble polyvinyl alcohol film having a thickness of 30$\mu$ is placed on the porous moistening material 11, as the member 9 is being sucked onto and is thus held by a film holding frame 12. The film holding frame 12 has a hollow chamber 13 defined in the wall surrounding the frame 12. A suction hole 14 communicating with the hollow chamber 13 is formed in the bottom plate portion of the chamber 13, and the hollow chamber 13 is connected to and communicates with a suction device (not shown) through a hose 15 and a changeover valve 16. When the suction device in operation communicates with the hollow chamber 13 of the film holding frame 12, a suction acts on the bottom plate portion of the chamber 13 of the frame 12 so that, when this bottom plate portion of the chamber 13 is pressed against the upper surface of the shielding member 9, the frame 12 holds the member 9 with suction, thereby allowing the shielding member 9 to be placed on the porous moistening member 11.

Subsequently, a material, denoted at 11*a*, of the same type as the porous moistening material 11 is evenly spread over the thus placed shielding member 9 in such a manner as to form a layer of about 1 cm, thereby attaining a state shown in FIG. 2. This state is maintained about 3 minutes to evenly moisten the shielding member 9. Thereafter, the porous moistening material 11*a* upon the shielding member 9 is removed, and the film holding frame 12 is moved upward, thereby obtaining the swollen shielding member 9.

Subsequently, the hollow chamber 2 of the shape pattern plate 1 is communicated with the suction device in operation so that a suction acts on the surface of the shape pattern plate 1. While the suction is acting on this surface, the film holding frame 12 with the swollen shielding member 9 is placed on the surface of the plate 1. By this operation, as the swollen shielding member 9 extends, under the suction applied thereto through the shape pattern plate 1, the member 9 is sucked onto and tightly adhered to the shape pattern 4 in compliance with the shape of the pattern 4. Thereafter, the application of suction through the film holding frame 12 is stopped, thereby leaving the member 9 on the shape pattern plate 1 and allowing the frame 12 to become separated from the shape pattern plate 1. A mold coating layer 17 is then manually formed on the upper surface of the shielding member 9.

The mold coating layer 17 comprises, as the main component, diatomaceous earth serving as a porous aggregate and having a particle size of several microns, and which additionally comprises graphite, and ethyl alcohol serving as a solvent.

Thereafter, a molding frame 18 is placed upon the shape pattern plate 1 in such a manner that a hollow portion is defined by the molding frame 18 and the shielding member 9. A filler 19 comprising a substance formed of particles of, for instance, an inorganic aggregate is then charged into the hollow portion. The shape pattern plate 1 and the molding frame 18 are vibrated together by means of a vibrator (not shown) to achieve a high packing density of the filler 19.

The molding frame 18 has a surrounding vacuum chamber 20 which is connected to and communicates with a suction device (not shown) through a hose 21 and a changeover valve 22.

A plurality of vent holes 23 communicating with the vacuum chamber 20 are formed in the inner wall of the molding frame 18. Further, the inner surface of the inner wall of the molding frame 18 is provided with a filter 24 having a fine gauge to prevent the filler 19 from passing therethrough.

Figure 3:
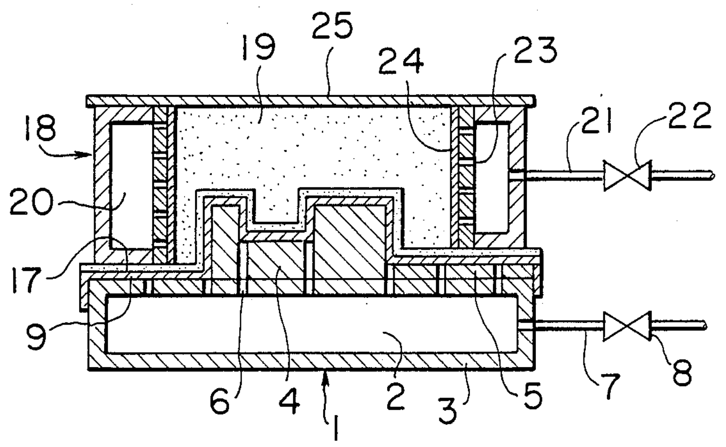
FIG. 3 is a sectional view showing a state in which one half of a mold is being prepared.

When the vacuum chamber 20 communicates with the suction device in operation and a sheet 25 impermeable to air is placed on the upper surface of the molding frame 18, a state shown in FIG. 3 is achieved. In this state, the filler 19 is subjected to suction applied through the vacuum chamber 20 of the molding frame 18 and the filler 19 is simultaneously subjected to external pressure through the sheet 25, whereby the filler 19 fixes under vacuum. When the vacuum fixation of the filler 19 has been achieved, the communication between the hollow chamber 2 of the shape pattern plate 1 and the associated suction device is disconnected, then the molding frame 18 is separated from the shape pattern plate 1. By this operation, pattern drawing is effected, with the shielding member 9, on which the mold coating layer 17 is formed, remaining sucked onto the filler 19. In this way, one half of a mold into which a sintering material slurry is to be poured is obtained.

Figure 4:
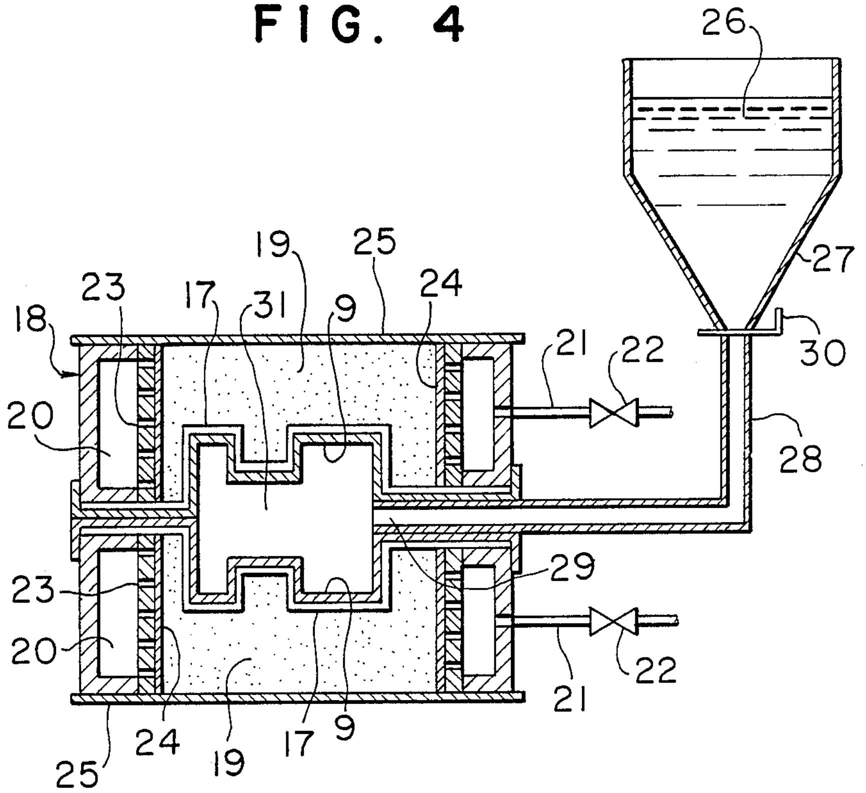
FIG. 4 is a sectional view showing a state in which a body is being formed.

Another half of the mold is prepared by the same steps as those described above. The thus prepared two halves of the mold are joined to each other to define a cavity 31. When an inlet pipe 29 communicating, through a gate 30, with the bottom of a tank 27 containing slurry 26 serving as a sintering material is communicated with a slurry flow passage 29, a state shown in FIG. 4 is achieved.

In the illustrated embodiment, the slurry 26 comprises 100 parts of an alumina powder having a particle size of 0.5 $\mu$, 1.0 part (as for organic solid contents) of a binder which is an emulsion of polyvinyl alcohol and wax, and 20 parts of water.

From the above-described state, the gate 30 is opened, and the sintering material slurry 26 is poured into the cavity 31 under gravity or by the application of pressure releasing the air in the cavity through an air passage (not shown).

The water contained in the thus poured sintering material slurry 26 permeates the shielding material 9 and is further absorbed by the mold coating layer 17 and the filler 19. As a result, a ceramic shaped body 32 formed of the aggregate is formed in the cavity 31.

The shaped body 32 is maintained in this condition for a predetermined time, thereby allowing the body 32 to fix until the shape of the body 32 can be maintained even after mold-parting.

Subsequently, the communication between the vacuum chambers 20 of the vertically joined molding frames 18 and the associated suction devices is disconnected so as to release the negative pressure within the molding frames 18. The upper sheet 25 is removed, then the upper molding frame 18 is removed.

Figure 5:
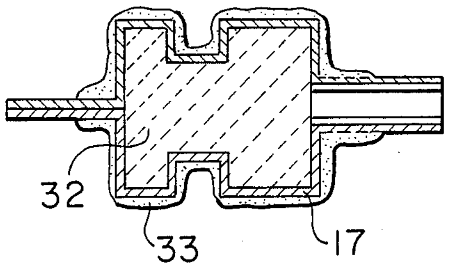
FIG. 5 is a sectional view showing a state in which a shaped body has been taken out from a mold.

By these operations, the filler 19 which has formed the upper half of the mold is allowed to collapse. The collapsing filler 19 is manually removed. Then the fixed ceramic shaped body 32 which is integral with the mold coating layer 17 which has absorbed water, and a water condensed layer 33 of the filler 19, are taken out from the mold, thereby achieving the state shown in FIG. 5. When the body shown in FIG. 5 is sintered, the mold coating layer 17 and the water condensed layer 33 are dried to be burnt off or naturally collapse, thereby obtaining a ceramic sintered body having a desired shape and a smooth surface.

Although, in the above-described embodiment, an alumina powder is used as the aggregate for the sintering material slurry, other ceramic powders may alternatively be used. Further, a sintering material may not be a ceramic material; for instance, a powder metallurgical material containing metals or non-metals may be used.

Further, although in the above-described embodiment, a member formed of polyvinyl alcohol is used as a water soluble shielding member, a member of a different material (for example, water unsoluble shielding member) may alternatively be used. Materials which may be used include polyethylene glycol, polyethylene oxide, methyl cellulose, carboxymethylcellulose, sodium polyacrylate, polyvinyl pyrrolidone, and polyvinyl butyral, and the materials described in the table 1.

Still further, although in the above-described embodiment, a water soluble shielding member is used, the member may not necessarily be water soluble so long as it is permeable to a solvent in the sintering material slurry, which can be provided with extensibility by the use of the slurry solvent, and which can be swollen in this way.

The above-described embodiment adopts a process employing a porous material 11 as a material for enhancing the flexibility and extensibility of the shielding member, and for causing the shielding member to swell. Alternatively, another process may be adopted in which the shielding member is maintained for a predetermined time in a vessel defining therein an atmosphere having a controlled high humidity (at a high concentration of solvent vapor).

What is claimed is:

1. A method of forming a shaped-body to be sintered comprising the steps of:

forming a slurry comprising particles of a material to be shaped into the body to be sintered and a solvent suspending said particles;

evenly moistening, with said solvent, a sheet-like shielding member permeable to said solvent, thereby swelling said shielding member and imparting flexibility and extensibility to said shielding member, which properties enable absorption and removal of said solvent from said slurry by said permeable shielding member during shaping of said slurry;

causing said swollen shielding member to be sucked onto and tightly adhered to a surface of a shape pattern plate;

disposing a molding frame on said swollen shielding member on the side thereof opposite to said shape pattern plate, and charging a filler, comprising a particulate substance, into said molding frame;

sealing the surface of said filler opposite to said swollen member and simultaneously producing a negative pressure within said molding frame, thereby causing said filler to fix under said negative pressure and simultaneously causing said shielding member and said filler to closely adhere together;

separating said shape pattern plate from said shielding member whereby preparing one half of a mold on said molding frame side;

joining said thus prepared one half of a mold to another half of said mold which has been prepared by the same steps as those mentioned above, thereby defining a cavity;

filling said cavity with said sluury comprising said particles to be sintered and said solvent absorbing and removing said solvent of said slurry through said shielding member by permeation of said solvent through said shielding member to form said shaped-body to be sintered with substantially even wall thickness from said slurry; then taking out said shaped-body to be sintered from said mold.

2. A method of forming a shaped-body to be sintered according to claim 1, wherein said shielding member is moistened by submerging it, for a predetermined time, in a porous moistening material containing said solvent.

3. A method of forming a shaped-body to be sintered according to claim 1, including maintaining said shielding member in an atmosphere having a high content of solvent vapor for a predetermined time to swell said shielding member.

4. A method of forming a shaped-body to be sintered according to claim 1, wherein said shielding member is water-soluble.

5. A method of forming a shaped-body to be sintered according to claim 1, wherein said filler to be charged into said molding frame is a substance formed of particles of an inorganic aggregate.

6. A method of forming a shaped-body to be sintered according to claim 1, wherein, after said shielding member has been sucked onto and tightly adhered to said surface of said shape pattern plate, a mold coating is coated on the surface of said shielding member opposite to said plate, thereby forming a mold coating layer.

7. A method of forming shaped-body to be sintered according to claim 1, wherein said solvent is water.

* * * * *